Oct. 6, 1964   A. F. GALLACHER   3,152,220
ELECTRIC CONDUCTING MEANS FOR METAL PIPES
Filed April 23, 1962   2 Sheets-Sheet 1
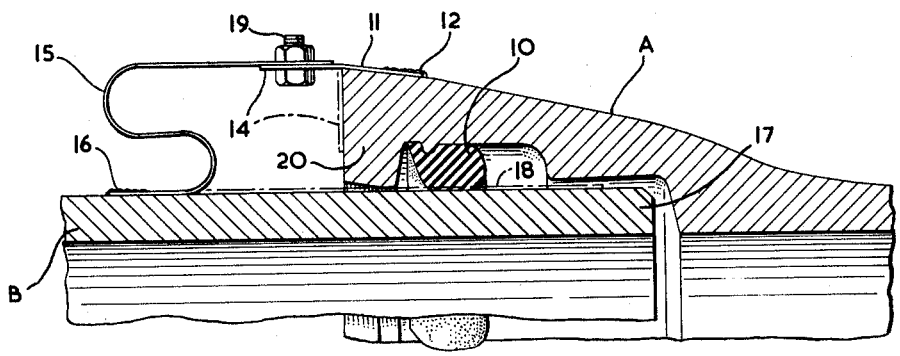
FIG. 1
FIG. 2
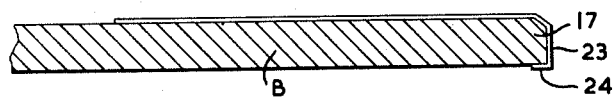
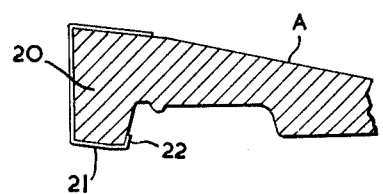
FIG. 3
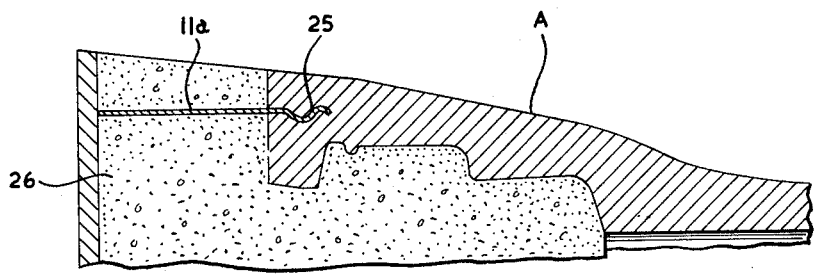
FIG. 4
INVENTOR
ANDREW F. GALLACHER
BY: *Fetherstonhaugh & Co*
ATTORNEYS

United States Patent Office 3,152,220
Patented Oct. 6, 1964

3,152,220
ELECTRIC CONDUCTING MEANS FOR METAL PIPES
Andrew Forbes Gallacher, Toronto, Ontario, Canada, assignor to Canada Iron Foundries, Limited, Toronto, Ontario, Canada
Filed Apr. 23, 1962, Ser. No. 189,534
Claims priority, application Canada, Oct. 7, 1961, 833,328
4 Claims. (Cl. 174—84)

This invention relates to electric conducting means for metal pipes as to establish electrical conductivity between joining pipes in the pipeline system.

The establishment of electrical conductivity through a pipe system, particularly underground systems, is necessary in order to permit the heating of the system to avoid freezing during the winter and to avoid the necessity otherwise of digging up the pipe system in the case where it has been rendered ineffective by freezing. A number of proposals have been made in this respect. Normally there is some metal-to-metal contact in these pipe joints but very often such contact is not sufficient to permit electrical conductivity therebetween and it is impractical to rely upon this contact which may achieve electrical conductivity in one joint and which may not produce conductivity in the adjacent or in other joints. Moreover, it has been the practice to employ flexible gaskets in the bell end of the pipe sections to effect a sealed joint with the spigot end of the next section. Since the gaskets are usually made of rubber or some other non-conducting material, their use further lessens the possibility of establishing satisfactory conductivity between the sections. It has been proposed, for instance, to incorporate conductors in the bell end of the pipe held by the gasket so that a positive conductivity condition would result. It was found, however, that the electrical current passed through only one of such conductors and had the result of burning out the flexible seal. It has also been proposed to apply and secure conductors when each joint is formed in the system but this entails substantial work and expense.

The present invention overcomes the general difficulties of the past and provides for the establishment of positive conductivity between pipe sections which may be established at reasonably low cost and with a minimum amount of work as the pipe sections are assembled together in situ. The invention generally embodies permanently securing a reasonably ductile bendable conductor to the bell end and to the spigot end of a pipe section in such manner as to cause said conductor strip to lie flat against the external surface of the pipe, the conductor on the bell end being of a length to project beyond the end thereof and bendable to lie against the end flange thereof so that the conductors in effect are identified with the normal contour of the pipe and will not be subject to damage and distortion during shipping and handling and whereby the conductors on the bell end of one section and the spigot end of the other may be readily bent from set position and lapped and connected in a simple manner when the pipe joint is assembled.

The invention will be clearly understood by reference to the following detailed specification taken in conjunction with the accompanying drawings, wherein FIGURE 1 is an enlarged fragmentary section taken through a pipe joint of the bell and spigot type showing in dotted line the manner in which the conductors are disposed in the normal course and illustrating the manner in which they may be bent and united to form a positive conductor between the pipe sections.

FIGURE 2 is a fragmentary longitudinal sectional view taken through the spigot end of a pipe showing a further adaptation in preliminarily locating the conductor as to assure its initial flat securement on the pipe.

FIGURE 3 is a similar view taken through the bell end of the pipe showing a similar adaptation in respect to the conductor on that end of the pipe section.

FIGURE 4 shows a further modification in the securement of the conductor strip to the bell end of a pipe section.

Figure 5:
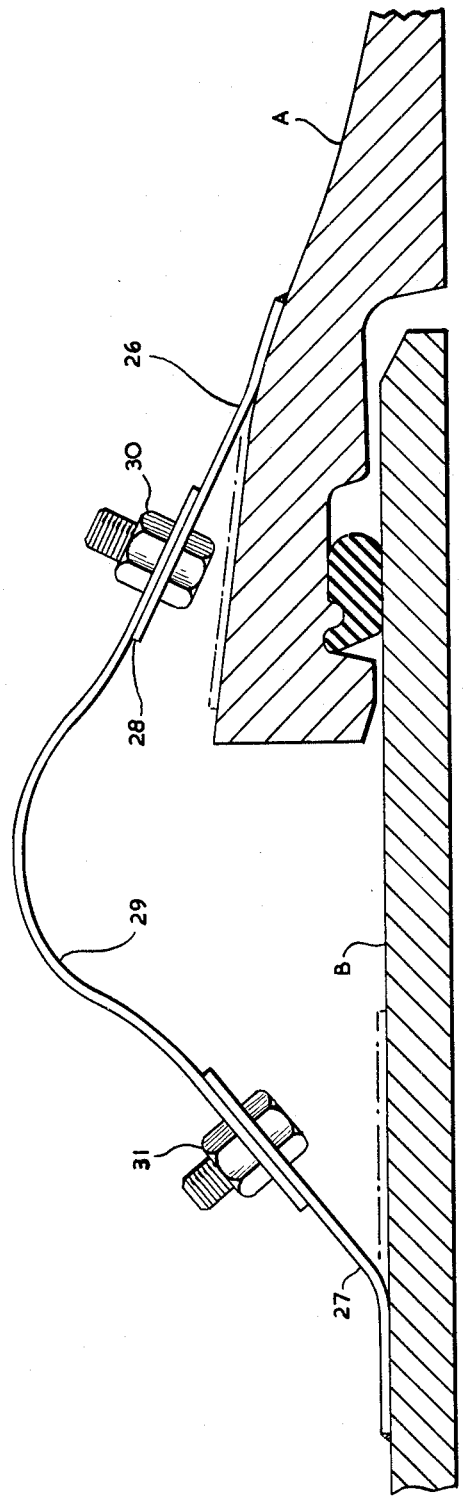
FIGURE 5 is an enlarged fragmentary longitudinal section taken through a bell and spigot pipe joint showing in side elevation an alternative form of construction of electrical conductor.

Referring to the drawings, A indicates the bell end of a pipe section and B indicates the spigot end of another pipe section. In the normal course the spigot end and pipe end are united as shown to form the joint which usually includes a sealing gasket such as 10. On the bell end of the pipe a relatively soft conductor strip 11, such as a soft copper strip, is welded as at 12 to the pipe surface preferably at a point spaced from the pipe end 13. The conductor strip 11 is of such length that it can be caused to project as at 14 beyond the end 13 of the pipe section. When the strip is so applied, the projection 14 is then bent to lie substantially flush with the end 13 of the pipe so that in the course of shipping it will not present a projection which might be damaged or distorted or broken off during shipping and handling. The spigot end of the pipe B is provided with a relatively elongated conductor strip 15 of similar material which is welded as at 16 to the spigot end at a point substantially remote from the terminal end 17 of the spigot and this strip is caused to lie substantially flush with the wall of the pipe as indicated by the dotted line 18. This may be held in such position as by a tape or tapes whereas, of course, the projecting portion 14 of the bell end may also be taped to assure that it maintains its position. Normally, however, the projection 14 because of its length and because of its ductile character will be maintained in a set position with little possibility of dislodgement. Each of the conductor strips 11 and 15 are preferably formed with a bolt orifice adjacent their free ends and when the joint is to be effected, the projection 14 of conductor 11 is bent upwardly substantially to the plane of its fastened end whereas the conductor 15 is suitably bent upon itself, such as illustrated in FIGURE 1, so that when the joint is effected, the free ends of conductors 11 and 15 will lap one another as to cause the orifices therein to register whereupon they are permanently connected in a simple manner such as by the securing bolt and nut combination 19.

Alternatively, as shown in FIGURES 2 and 3, the conductors 11 and 15 may be made longer such that in the case of conductor 11 it may be bent not only to lap the end 13 but also to lap the inner circumferential face of the flange 20 as at 21 and, if desired, to lap the innermost wall of the flange as at 22. Likewise in the case of conductor 15, it may be bent to lap the terminal end 17 of the spigot as at 23 and bent also to lap as at 24 the inner surface of the spigot at the terminal end 17.

In an alternative proposal, the conductor 11a may be embedded in the bell end of the pipe as at 25 when the pipe is cast by positioning this conductor in the core 26 to maintain it in position during casting but otherwise it will function in exactly similar manner to conductor 11 as above described.

A still further alternative construction is illustrated in FIGURE 5. According to this alternative, the bell end A of one pipe section and spigot end B of the joining section are each provided with a suitable flat conductor strip, such as a relatively soft copper strip 26 and 27, respectively, which are suitably anchored to the pipe such as by welding as to form a permanent element of each section.

The conductor strips 26 and 27 are relatively short in character and conductor strip 26 is so mounted that its unanchored or free end 28 will be located respectively close to the terminal end of the bell portion of pipe section A, but preferably spaced inwardly from this terminal end. Conductor strip 27 is located inwardly a substantial distance from the terminus of the spigot end of pipe section B. In both cases, as shown in dotted lines, the conductor strips 26 and 27 when anchored can be caused to lie snugly against the pipe. Accordingly, by reason of their short length and spacing from the terminal ends of the pipe sections to which they are secured, the possibility of bending or displacing the free ends of these conductor strips during handling of the pipe sections is largely eliminated.

The conductor strips 26 and 27, according to this modification of the invention, are connected for electric conduction purposes by means of a bridging conductor strip 29 and by suitable means such as the bolt and nut combination 30 and 31, respectively. In this instance, the conductor strips 26 and 27 may be orificed adjacent to their free ends prior to anchoring to the pipe sections and when corresponding orifices in the bridging conductor strip are brought into registry, it may be fastened to conductor strips 26 and 27 by means of the bolt and nut combination illustrated. Alternatively, any other practical means of securement may be employed for connecting the bridging conductor 29 with the conductor strips 26 and 27.

It will be clear from the foregoing that I have provided a very simple and effective means of achieving electrical conductivity between joined pipe sections which may be applied and which may be connected together at the joint in a very simple manner as to provide a positive conductor between the pipe sections. While it is preferred to weld the strips to pipe sections and it is preferred to effect the connection between the conductors by means of a bolt and nut combination, it will be obvious that any simple practical means of securement may be employed.

What I claim as my invention is:

1. As an article of manufacture, a section of metal pipe having a bell end and a spigot end for effecting connection to adjoining pipe sections of like configuration, said pipe section including electric conducting means for electrically bridging said connections, said conducting means comprising a ductile strip of conducting metal anchored adjacent to each end of the pipe section and lying substantially flat against the exterior wall of the pipe section, said strips being anchored adjacent one end thereof leaving their opposite ends free, said free ends of said strips being bendable outwardly from the exterior wall of said pipe section for connection to a similar strip of an adjoining pipe section.

2. As an article of manufacture, a section of metal pipe having a bell end and a spigot end for effecting connection to adjoining pipe sections of like configuration, said pipe section including electric conducting means for electrically bridging said connections, said conducting means comprising a ductile strip of conducting metal anchored adjacent to each end of the pipe section and lying substantially flat against the exterior wall of the pipe, the strip at the bell end of the pipe projecting beyond said bell end and bent to lie substantially flat against the terminal portion of the bell end, said conducting strips being bendable to lap with corresponding strips on said adjoining pipe sections and being securable together for the passage of electric current across said connections.

3. The article of manufacture as claimed in claim 1, in which the conducting strip on the spigot end of the pipe section is of a length to project beyond the spigot end and is bent substantially to lie against the terminus of the spigot end.

4. The article of manufacture as claimed in claim 1, in which the conducting strip on the spigot end of the pipe section is of a length to project beyond the spigot end, said strips being bent so that the terminal end of each strip is disposed within the bore of the pipe.

References Cited in the file of this patent

UNITED STATES PATENTS

| 622,481 | Jackson | Apr. 4, 1899 |
| 646,742 | Knudson | Apr. 3, 1900 |
| 2,999,124 | Burke | Sept. 5, 1961 |

FOREIGN PATENTS

| 534,783 | Great Britain | Mar. 18, 1941 |